Feb. 22, 1966 L. RAY 3,236,248
TANK WASHING SYSTEM AND CONTROL APPARATUS
Filed March 15, 1963 2 Sheets-Sheet 1

INVENTOR:
LEROY RAY,
BY Kingsland, Rogers, Ezell & Robbins
ATTORNEYS

Feb. 22, 1966  L. RAY  3,236,248
TANK WASHING SYSTEM AND CONTROL APPARATUS
Filed March 15, 1963  2 Sheets-Sheet 2

INVENTOR:
LEROY RAY,
BY Kingsland, Rogers, Ezell & Robbins
ATTORNEYS

United States Patent Office 3,236,248
Patented Feb. 22, 1966

3,236,248
TANK WASHING SYSTEM AND
CONTROL APPARATUS
Leroy Ray, Springfield, Mo., assignor to Paul Mueller
Company, Springfield, Mo., a corporation of Missouri
Filed Mar. 15, 1963, Ser. No. 265,400
14 Claims. (Cl. 134—58)

The present invention relates to a tank washing system and control apparatus. It is particularly adapted for use with milk storage tanks but may be used in connection with other similar apparatus.

The utility of the present invention can be understood when it is realized that bulk milk storage has become a much-used method of handling milk. Bulk milk storage involves the retaining of large quantities of milk in a tank under refrigeration for hours and sometimes days at a time at the farm or other central location from which it is ultimately collected and taken to a dairy for processing and distribution. Since these bulk tanks receive so perishable a commodity, it is necessary that they be thoroughly cleaned frequently. It is also essential that the cleaning be thorough and it must be done in a minimum length of time and with a minimum of effort. Frequently it must be done at a farm or other establishment where sophisticated facilities and trained personnel are not available. Yet it must always be effectively done.

The present invention includes apparatus connectable with hot and cold water supplies and with the familiar 230 v. electric power, by which apparatus the operator can completely clean a tank without difficulty. The equipment requires only a minimum of permanently installed apparatus and it is flexible enough so that it can be used with more than one tank by a simple change of its connections.

Specifically, the apparatus in its preferred form includes a liquid circulating system comprising a pump and tubing connectable to an inlet and a drain outlet of the tank. The inlet tubing has a rotating spray head that can be attached to it to depend into the tank and spray the cleaning liquid over the interior surface of the tank. Additionally, there is a drain valve device that is hydraulically operated, it being connected into the tubing connected to the tank outlet. This valve contains also a fresh water inlet opening into that tubing. There is a control panel, having a one-cycle timer and valves operated thereby in fixed sequence to admit cold water, or hot water plus detergent, to the fresh water inlet, and to operate the hydraulic drain valve. The time cycle is instituted by simply pressing a switch button.

The preferred form of the cycle of operation includes: initially introducing cold water for a predetermined time, circulating it, and spraying the tank with the cold water to perform a pre-rinse operation; draining this rinse water; admitting a predetermined quantity of hot water mixed with a detergent; circulating this and spraying it into the tank for a fixed time; draining it; and performing another rinsing operation similar to the first. At the completion of the foregoing cycle, the timer stops and the system remains inoperative until a starting button is again pushed.

It is an object of the invention to provide the foregoing cycle with equipment that is fully automatic and yet which can readily be used with simple hot and cold water connections and an electric power source. It is also an object to provide such a system that can be connected into different tanks to be cleaned that are separated but reasonably close together so that the amount of equipment for cleaning a number of tanks is kept at a minimum. It is a further object of the invention to provide such equipment that itself can be readily and thoroughly cleaned.

It is an important object of the invention to provide a cleaning system that is dependable, that can be operated by unskilled personnel and that will produce good cleaning under practically all circumstances, even with inept supervision.

Other advantages will appear from the description to follow. It also will be understood that certain features and components of the present apparatus can be used to advantage without the others, although it is desired to use the whole system for obvious reasons.

Figure 1:
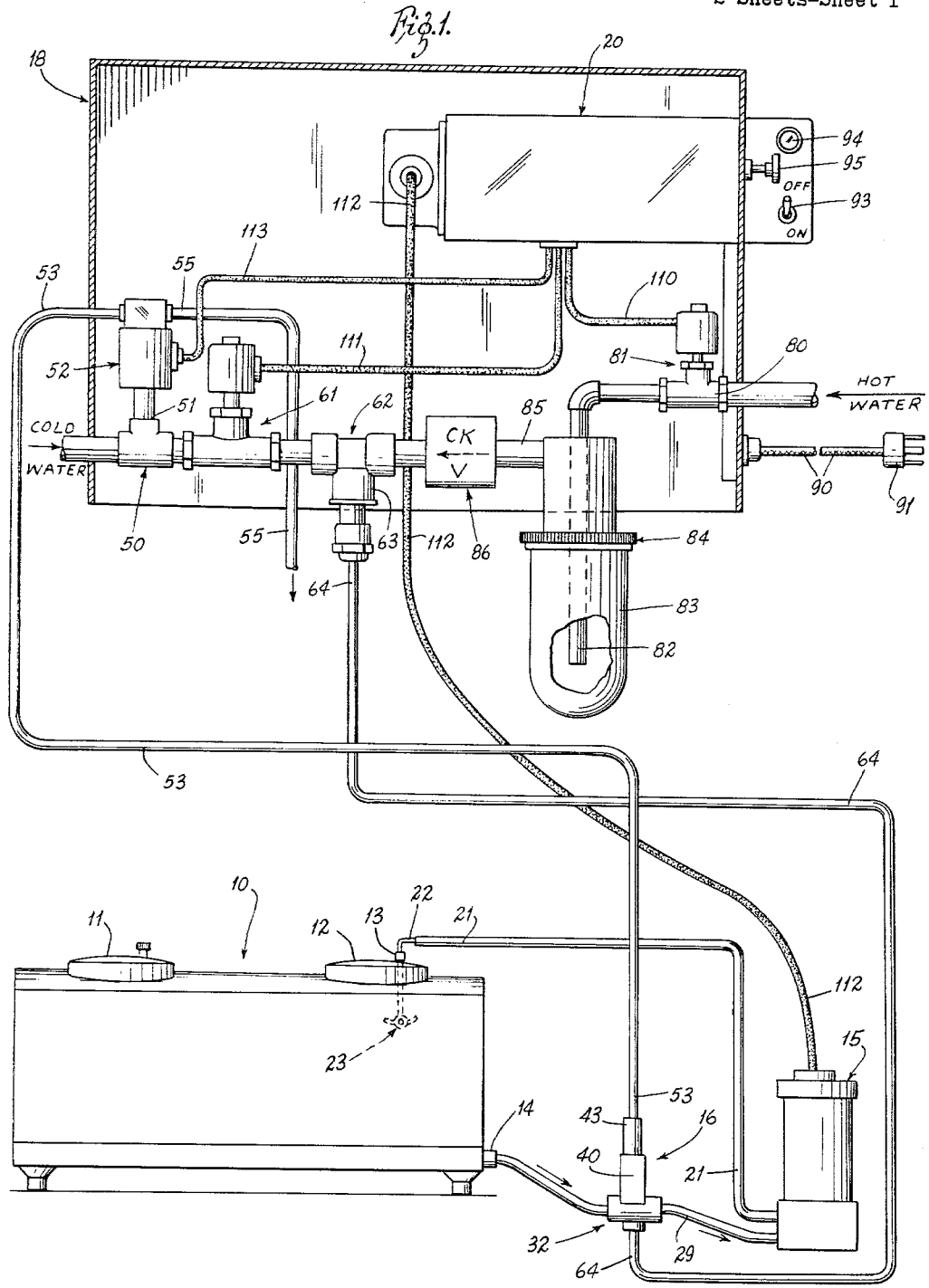
FIGURE 1 is a schematic view of the entire mechanism associated with a tank to be cleaned.
Figure 2:
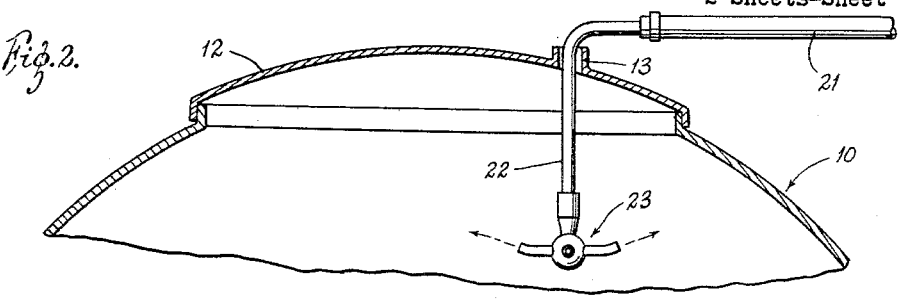
FIGURE 2 is a schematic fragmentary view showing the spray head connected and depending into the tank.

Referring to FIGURE 1, a milk tank is generally indicated at 10. This illustration is designed to represent various sizes and shapes of milk tanks and particularly bulk milk tanks although it will be understood that the apparatus can be used for many other devices. As to bulk milk storage tanks, some of them are the so-called atmospheric tanks and others are vacuum tanks. Also some have built-in refrigeration means such as the familiar coils attached to the walls thereof while others are cooled by other means. As far as the present equipment is concerned, the presence or not and the style of the refrigerating equipment is not important.

In the tank illustrated, there are two covers 11 and 12 that can be opened to give access to the interior of the tank which consists of a single large open receptacle. An inlet 13 is shown in the cover 12. Usually this is a milk inlet adapted to be connected to a milking machine. The tank has a drain outlet 14, usually controllable by a valve not shown here because it has been removed for the installation of the cleaning equipment.

The present apparatus includes a circulating pump 15 having piping as will be described. It also includes a drain valve 16 illustrated in detail in FIGURES 3 and 4. And it includes a control panel assembly 18. This control assembly includes a piping, valves and a timing control, all to be described. The timing control is generally indicated at 20.

Referring to the liquid circulating mechanism, which comprises a pump, tubing, a spray head, the tank, and the drain valve, the pump 15 should be of a high-speed type, electrically operated as will appear. It is removably connected by a flexible plastic tube 21 to a smaller tube 22 that can be fitted into the opening 13. Inside the tank 10, the tube 22 removably receives a spray head 23 of a type that is rotated by the flow of water, and sprays the entire interior of the tank.

The outlet or drain 14 of the tank 10 is connected by a short plastic tube 28 to the drain valve 16, which in turn is connected by a short plastic tube or pipe 29 to the inlet of the pump 15. Thus the circulating system from the pump 15 includes the outlet pipe 21, the tube 22, the spray head 23, the tank 10, the outlet 14, the pipe 28, the valve 16 and the pipe 29 back into the pump.

Figure 3:
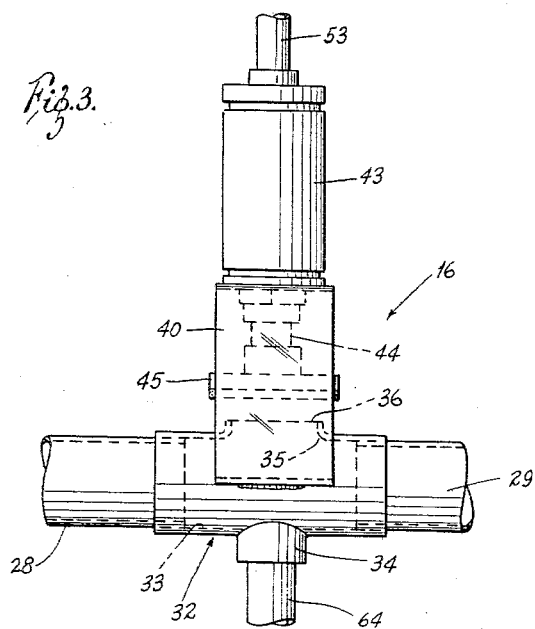
FIGURE 3 is an elevation of a drain valve used with the system.
Figure 4:
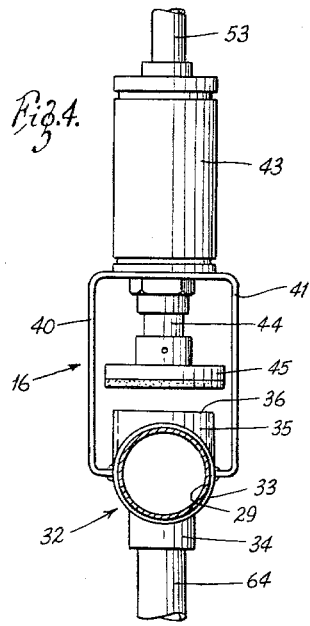
FIGURE 4 is an elevation of the drain valve taken at right angles to FIGURE 3.

The drain valve assembly 16, which is shown in greater detail in FIGURES 3 and 4, has a four-way valve body including a stainless steel body 32 that actually constitutes a T with a through-passage 33, an intermediate passage 34, threaded as shown, and a medial outlet 35 opposite the passage 34 and providing a valve seat 36. The pipes 28 and 29 are fitted into the ends of the passage 33 and can be cemented in place so as not to leak. If desired, the pipes 28 and 29 can be made of one continuous tube which has holes in it to register with the outlet 34 and the drain outlet 35. It will be seen that the passages are straight-through and free of re-entrants. As will appear, the fresh water inlet 34 and the hydraulic cylinder 43 are connected to controlled water supplies.

The valve body 32 supports two straps 40 and 41 that in turn support a nose-mounted cylinder assembly 43. This assembly contains a hydraulic piston, not shown, with a piston rod 44 on the end of which is mounted a valve 45 that can cooperate with the upper seat edge 36 of the drain 35. When water pressure is supplied to the upper end of the cylinder 43, the piston will be forced downwardly, closing the valve 45 against the seat 36 and holding it closed. When the water pressure is relieved, the piston will be raised and the valve 45 opened away from the seat 36 by appropriate spring means (not shown) as known in the art.

The control panel 18 has fittings to receive both hot and cold water. A T 50 constitutes a connection for a cold water inlet. The T 50 has its middle outlet 51 connected through a three-way solenoid valve 52 that is also connected with a pipe 53 leading to the top of the cylinder 43, and with a waste tube 55. Thus cold water may be delivered through the valve 52 to the pipe 53 where it acts on the piston within the cylinder 43 to maintain the valve 45 closed. Or when the solenoid valve 52 is energized, the connections are shifted to connect the pipe 53 with the relief pipe 55, whereby the pressure is drained from the cylinder 43 and the valve 45 can open.

The T 50 is also connected through the body of a flow control solenoid valve 61 to a plastic T 62. The plastic T has its middle outlet 63 provided with a fitting by means of which it can be attached to a flexible pipe 64 that is connected into the inlet passage 34 of the drain valve 16.

Hot water is admitted to the control panel through an inlet 80 of a flow control solenoid valve 81 similar to the valve 61. The water passes thence through the dip tube 82 of a detergent mixer 83. The bowl of the detergent mixer 83 is removable as indicated at 84 so that a predetermined amount of detergent can be disposed in the bowl for washing, as will appear. The detergent mixer has an outlet 85 connected through a check valve 86 that permits flow from the detergent mixer to the T 62 but prevents flow in the opposite direction.

Figure 5:
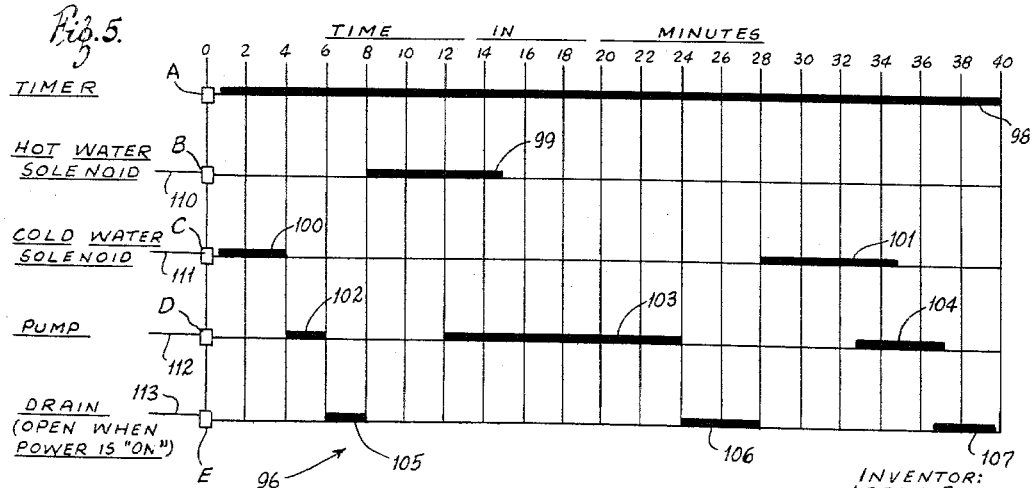
FIGURE 5 is a developed view of the program of the control.

Power into the control is preferably provided from a 230 v. 60-cycle single phase source. The control panel can have a cable 90 and a three-pronged locking terminal 91 to bring the power in. The power may be brought to a master switch 93. A pilot light 94 is connected to shine when the switch 93 is in its "on" position. Power is delivered through the switch 93 to a time delay switch 95, and thence to the timer motor which rotates a programming switch drum 96 illustrated in development in FIGURE 5. It will be understood from FIGURE 5 that there are five fixed brush contacts A, B, C, D and E, one for each of the five tracks of the drum 96. The fixed contacts close in timed relation with the conductive strips 98, 99, 100, 101, 102, 103, 104, 105, 106 and 107, during rotation of the drum. The five brush contacts can complete circuits through the several drum conductor strips when in contact therewith, during rotation of the drum, but these circuits are broken when the strips are moved away from the brushes by rotation of the drum. This type of timer and programming device is well-known in the art and need not be described in detail. Conventionally, it is operated by a constant electric speed motor. Hence, the several contacts are closed through their strips for fixed intervals. The brush A connects to the timing motor (not shown) to provide a holding circuit therefor. The brush B connects by wiring 110 to the solenoid that opens the hot water valve 80. The brush C connects by wiring 111 to the solenoid that opens the cold water valve 61. The brush D connects through a socket by wiring 112 to the pump 15. And the brush E connects by wiring 113 to the solenoid that moves the valve 52 to pressure relief position that lets the drain valve 16 open.

Operation

The device is semi-portable in that the pump, spray head and piping can be moved within a radius around the panel 18. It can be set up in a room where cleaning is to be done and connected into the tanks one after another.

In setting up this washing apparatus, the control panel 18 is attached to the wall at an appropriate height. Cold water is connected into the cold water inlet T 50 and hot water to the hot water inlet 80. It is preferable to have manual valves in these two water inlet lines for obvious reasons.

The outlet of the pump 15 is connected to the hose 21. The spray 23 is placed inside the lid 12 of the tank 10 and the tube 22 passed through the opening 13 for connection with the end of the hose 21. The drain outlet 14 of the tank 10 is connected by the hose 28 to the drain valve 16 as indicated heretofore, or as also was explained, may be connected through that valve if the hose has appropriate openings for the drain and fresh water inlet. The pipe 29 is connected to the inlet of the pump 15. The pipe 53 is connected to the drain valve 16. The drain valve is also connected by the pipe 64 to the fitting on the T 62.

The pipes 27, 28 and 29 are preferably made of a clear plastic material 1½ inch diameter tubing. The tank 10 is usually made of stainless steel and the liquid contacting portions of the valve 16 and the pump 15 should be of stainless steel.

The electrical connections should be made as indicated. When the plug 91 is connected to a source of power, the pilot light 94 will shine indicating the presence of power up to the switch 95. Plugging in the pump wire 112 makes it possible for the timer to start and stop the pump.

At the start, hot water is admitted to the valve 80, which is closed; and cold water is admitted to the T 50. It passes through the T 50 to the flow valve 61 which is closed. It also flows upward from the T 50 through the three-way valve 52 to the pipe 53 and the cylinder 43 at the top of the drain valve 16, forcing the valve 45 closed against the seat 35. This condition continues as long as the solenoid valve 52 is de-energized.

To start a cycle of operation the main switch 93 is turned on, and then the switch 95 is operated. This starts the timer motor to rotate the drum 96. The switch 95 is a time delay switch which will remain closed a predetermined length of time, slightly more than enough to permit the timer motor to cause the brush A to engage the contact strip 98. This, as is well-known, can provide a holding circuit around the time delay switch 95 that will continue the timer motor in operation until it makes a complete revolution from its starting point. Here that will be forty minutes after the start. When the revolution is completed, the strip 98 is moved away from the brush A of the timer motor, and all circuits are open.

After one minute of timer motor operation, the control motor drum 96 makes a circuit through the contact strip 100 and the brush C. This energizes the cold water solenoid or flow control valve 61, so that it opens. The cold water that theretofore was introduced through the T 50 up to the solenoid 61, now flows through the T 62 and its middle outlet 63 and the pipe 64 to the inlet 34 on the drain valve 16. Hence, the cold water in predetermined quantity flows into the tube 21 and the tank 10.

The cold water in the T 62 in the control panel is blocked by the check valve 86 from flowing rightwardly toward the detergent bowl.

After four minutes, the strip 100 opens the circuit to the valve 61, which closes and stops the inflow of cold water to the drain valve 16. At the same time, the strip 102 closes the circuit through the brush D to start the pump 15, which then circulates this cold water through the pump, out the pipe 21, and the spray head 23, to flush the interior of the tank 10 with cold rinse water, which then flows back to the pump through the pipes 28 and 29. This circulation continues for two minutes and then stops when the strip 102 passes its contact brush D. At the time this latter event occurs, the strip 105 makes contact with its brush E and energizes the drain solenoid 52. This turns the three-way valve 52 to disconnect the tube 53 and the cylinder 43 from water under pressure, and to connect the pipes 53 and 55 together. The relief passage thus established permits the spring means within the cylinder 43 to open the valve 45, the water thus driven back through the pipe 53 being passed to waste by the pipe 55. When the valve 45 opens, the cold water within the tank drains out. It may be observed that the drain valve should be disposed at a level low enough to permit this water to flow out as stated. This should be the lowest point in the system.

The draining continues for two minutes, after which the strip 105 leaves its brush E. This takes place eight minutes after the beginning of the cycle, and at the same time the strip 99 meets its brush B and closes the hot water solenoid circuit. Thus the de-energization of the solenoid 52 takes place, permitting cold water under pressure again to pass through the pipe 51 and close the drain valve 45, and at the same time the solenoid valve 81 opens admitting hot water to the system.

Prior to starting, the bowl 83 will have been supplied with an appropriate amount of detergent. When the hot water flows through the inlet 82 of the detergent receptacle, it mixes with detergent and the mixture is driven through the outlet 85, past the check valve 86 and into the T 62. The valve 61 is closed at this time, so this hot water and detergent mixture flows downwardly through the center outlet 63 of the T 62 through the pipe 64, and through the inlet 34 of the drain valve 16 into the circulatory system of the tank 10. At this time the pump is not operating.

The hot water is caused to flow in for a period of four minutes, at the end of which time the pump 15 starts again by virtue of contact of the strip 103 with the brush D for the pump circuit. Hot water continues to flow in for another three minutes. At the end of fifteen minutes the strip contact 99 leaves the brush B, closing the hot water valve. But from the twelve minute point on for twelve minutes, the pump operates, circulating the detergent-hot water mixture through the tank by the pipe 21, the spray head 23, the outlet 28, the drain valve 16 which is closed, and the pipe 29. This is the principal washing cycle during which time the accumulated soils in the tank are washed out by the repeated circulation of the hot water and detergent mixture.

Twenty-four minutes after the cycle starts, the pump stops when the track 103 runs off the contact brush D. At the same twenty-four minute point the strip 106 makes contact with the brush E and the solenoid 52 is energized, again exhausting the water from the top of the cylinder 43 through the pipes 53 and 55, permitting the drain valve 45 to open and the water and detergent mixture to drain out. Drainage is permitted to continue for a period of four minutes, after which the strip 106 runs out from under its brush E and the drain valve is immediately reclosed by the admission of cold water to the cylinder 43.

The foregoing occurs twenty-eight minutes after the cycle begins. Also at this point the cold water solenoid 61 is again operated by the strip 101 making engagement with its brush C. Cold water is again admitted into the tank by the pipe 64, the drain valve 16, and the pipe 28. After thirty-three minutes the strip 104 meets its brush D and the pump 15 is again put into operation, circulating this cold water through the tank 10 in the manner heretofore described. This circulation overlaps the introduction of cold water for a period of two minutes and continues for another period of two minutes after the cold water solenoid strip 101 has left its brush C. Thirty-seven minutes after beginning of the cycle, the strip 104 leaves its brush D and the pump again stops. At the same time, the strip 107 closes with its brush E and the drain valve solenoid 52 is energized, opening the drain valve 45 and permitting the cold rinse water to drain out. Some seconds before the end of the forty minute cycle and the de-energizing of the timer motor, the strip 107 leaves its brush E and the drain valve is permitted to reclose. It normally remains reclosed because of the de-energization of the solenoid 52 and the continuous presence of the cold water under pressure into the T 50. It is only when an external control valve is operated, that this cold water is turned off.

At the end of the forty minute cycle, the timer motor strip 98 leaves its brush A and the cycle is completed. Upon its completion the hose clamps for connecting the hose 28 to the outlet 14 of the tank 10 can be removed and the conventional drain valve reconnected. Also the connection of the spray head into the top of the tank can be removed. The inlet for the spray head can be covered over, or it can be reconnected to a milk line or the like if the tank is in the right position. The cleaning pipes can be connected to another adjacent tank if desired.

It will be observed that all of the tubing and apparatus that conducts liquid to and from the tank is readily cleanable. The tubes 21, 28 and 29 preferably are made of a transparent plastic material but in any event they can be cleaned out easily. The inlet water piping can readily be dis-assembled as is evident from the drawing. All of the valves, T's and connections in the control panel can be entirely dis-assembled. Also it is evident that a brush can be passed through the system horizontally if the detergent receptacle is disconnected. The T 62 is desirably made of plastic.

The drain valve itself is open through as is evident from the drawings so that it can be completely cleaned, and so that there are no crevices in which milk particles can remain and be transferred back into the tank during the period of circulation.

Various changes and modifications may be made within the process of this invention as will be readily apparent to those skilled in the art. Such changes and modifications are within the scope and teaching of this invention as defined by the claims appended hereto.

What is claimed is:

1. In cleaning apparatus for cleaning a tank having an inlet opening and a drain opening, the combination of: a portable high speed pump having a suction port and a pressure port; first flexible tubing means connected to the pressure port, and having its end extending into the tank inlet opening, with a rotatable spray head connected onto said end; second flexible tubing means removably connected to the tank drain opening and the suction port of the pump; a drain valve means including a body having a through-passage to receive the second tubing means; the drain valve means body having also a drain opening and a liquid inlet passage, both connecting into the through-passage; the second tubing means opening into the said drain opening and the said liquid inlet passage; a drain valve for opening and closing the drain opening; hydraulic means to operate the valve including a cylinder and a piston mounted on the drain valve body, and operable to close the drain valve when hydraulic pressure is present in the cylinder; a cold water supply pipe; an electrically operated three-way valve, means connecting it to the cold water supply; flexible tubing connecting it to the cylinder of the drain valve operating means, to supply hydraulic pressure thereto; an exhaust connection for the three-way valve; the three-way valve normally connecting the cold water supply to the tubing leading to the drain valve operating means, and when energized, connecting to the said tubing to the exhaust connection to relieve the hydraulic pressure in the cylinder; an electrically operated flow control valve in the cold water supply pipe; flexible water supply tubing connecting the outlet of the flow control valve to the liquid inlet of the drain valve means body; a hot water supply pipe; an electrically operated hot water flow control valve in the hot water supply pipe; a detergent supply device connected to the outlet of the hot water flow control valve, with its outlet connected through a check valve to the flexible water supply tubing leading to the inlet of the drain valve; and timing mechanism for sequentially operating the cold water valve, and three-way valve for the drain, the hot water valve, and the pump; the timing mechanism being selectively startable and thereafter operating through its cycle and stopping, and including means to operate the cold water valve to introduce cold water into the tank, means to operate the pump to circulate said cold water, and means to operate the three-way valve to open the drain valve and drain off said cold water, the timing mechanism operating said means in timed sequence; the timing mechanism also including means to operate the hot water valve to introduce hot water and detergent into the tank, means to re-operate the three-way valve to open the drain and drain off said hot water; the timing mechanism operating said means in timed sequence; and further including means to reoperate the cold water valve to reintroduce cold water into the tank, means to operate the pump, and means to operate the three-way valve to open the drain and drain off said cold water, the timing mechanism operating said means in timed sequence, and including means thereafter to shut itself off.

2. In cleaning apparatus for cleaning a tank having an inlet opening and a drain opening, the combination of: a pump having a suction port and a pressure port; first tubing means connected to the pressure port, and having its end extending into the tank inlet opening, with a spray head connected onto said end; second tubing means removably connected to the tank drain opening and the suction port of the pump; a drain valve means including a body having a passage to receive the second tubing means whereby the drain valve is connected into the second tubing means between the tank drain opening and the pump; the drain valve means body having also a drain opening and liquid inlet passage, both connecting into the first-named passage; the second tubing means communicating into the said drain opening and the said liquid inlet passage; a drain valve for opening and closing the drain opening; means to operate the drain valve mounted on the drain valve body; a cold water supply pipe; an electrically operated flow control valve in the cold water supply pipe; water supply tubing connecting the outlet of the flow control valve to the liquid inlet of the drain valve means body; a hot water supply pipe; an electrically operated hot water flow control valve in the hot water supply pipe; a detergent supply device connected to the outlet of the hot water flow control valve, with its outlet connected through a check means to the flexible waer supply tubing leading to the inlet of the drain valve; and timing mechanism for sequentially operating the means to operate the drain valve, the cold water valve, the hot water valve, and the pump; the timing mechanism being selectively startable and thereafter operating through its cycle and stopping, and including means to operate the cold water valve to introduce cold water into the tank, means to operate the pump to circulate said cold water, and means to operate the drain valve operating means to open the drain valve and drain off said cold water, the timing mechanism operating said means in timed sequence; the timing mechanism also including means to operate the hot water valve to introduce hot water and detergent into the tank, means to reoperate the pump to circulate the hot water, and means to re-operate the drain valve operating means to open the drain valve and drain off said hot water; the timing mechanism operating said means in timed sequence; and further including means to re-operate the cold water valve to reintroduce cold water into the tank, means to operate the pump, and means to operate the drain valve operating means to open the drain and drain off said cold water, the timing mechanism operating said means in timed sequence, and including means thereafter to shut itself off.

3. In cleaning apparatus for cleaning a tank having an inlet opening and a drain opening, the combination of: a pump having a suction port and a pressure port, first tubing means connected to the pressure port, and having its end extending into the tank inlet opening, with a spray head connected onto said end; second tubing means removably connected to the tank drain opening and the suction port of the pump; a drain valve means including a body having a passage to receive the second tubing means, whereby the drain valve is connected into the second tubing means between the tank drain opening and the pump; the drain valve means body having also a drain opening and a liquid inlet passage, both connecting into the first-named passage; the second tubing means communicating into the said drain opening and the said liquid inlet passage; a drain valve for opening and closing the drain opening; means to operate the drain valve mounted on the drain valve body, the drain valve operating means including a cylinder and a piston mounted on the drain valve body, and operable to close the drain valve when hydraulic pressure is present in the cylinder, valve means remote from the cylinder, and tubing connecting the valve means to the cylinder, whereby the valve means may admit hydraulic pressure to the cylinder and may relieve the same, and means to operate the remote valve means.

4. The combination of claim 3, wherein the drain valve means includes a valve body providing also a liquid inlet for the second tubing means, by which liquid can be introduced into the tank and circulated; and fresh water tubing means for connecting said liquid inlet to a water supply source.

5. The combination of claim 4 with valve means to regulate introduction of fresh water into the fresh-water tubing means.

6. The combination of claim 5, with timing mechanism to operate the fresh water valve means and the drain valve operating means in predetermined timed sequence.

7. In cleaning apparatus for cleaning a tank having an inlet opening and a drain opening, the combination of a pump having a suction port and a pressure port, a panel having mounted thereon a timing mechanism and water control mechanism, the latter comprising a first three-way connector for attachment to a first water supply; a three-way valve connected to one branch of the three-way connector and means to operate the same; a first flow control valve in series with the three-way connector, with automatically operable means to open and close the flow control valve; a second three-way connector in series with the first flow control valve and having one of its outlets for connection to a tube; a second flow control valve adapted for connection to a second water supply and having means for operating the valve automatically to open and close it; a detergent supply device in series with the second flow control valve; a check valve in series downstream with the detergent device, the second three-way connector being also in series with the check valve; the timing mechanism including means to produce sequential, timed operations of the three-way valve operating means and the two flow control valves.

8. The combination of claim 7, wherein the timer is electrically operated, and the three-way and flow control valves are electromagnetically operated.

9. In a washing apparatus for cleaning a tank: a fluid circulating pump; piping adapted to be connected to the tank when it is desired to clean the tank and to be removed therefrom afterward, including a high pressure pipe connected to the pump, extending therefrom, and having a flexible portion for inserting the end of the pipe into the tank, thereby connecting the pump to the tank; a low pressure pipe extending from the pump and having a flexible portion to enable the end of a pipe to be removably connected to the tank for connecting the tank back to the pump; a drain valve means interposed into the low pressure pipe, and having a valved opening thereat through which liquid may escape to the outside for draining liquid from the tank, operating means adjacent the valve means for opening and closing the drain valve means, the flexible pipe portions enabling the drain valve means to sag to the floor, a remotely disposed electrically operated control for the drain valve operating means, and mechanical means including a flexible connection interconnecting the control and the operating means, to cause the control to effect opening and closing of the valve means by the action of the mechanical means without requiring electrical wiring adjacent the drain valve, that could be subject to grounding if the floor, whereon the drain valve means rests, was wet.

10. In the apparatus of claim 9, the mechanical means for operating the valve means including a hydraulic motor operated by providing and relieving hydraulic pressure upon it, the control including an electrically operated valve mechanism that directs or relieves hydraulic pressure to it.

11. In the apparatus of claim 9, the high pressure and low pressure pipes being flexible tubes whereby they are readily connectible to the tank; and the mechanical means interconnecting the control and the valve means including a hydraulic operating mechanism having a flexible tube from the remote control to the valve means.

12. In a washing mechanism: a water tube connection; a hot water line and a cold water line both connected to the tube connection whereby hot water or cold water may be conducted thereto; an electrically-operated hot water valve in the hot water line and an electrically-operated cold water valve in the cold water line; an electrically-operated drain valve control and a timing mechanism; the drain valve control including a three-way valve and operating means therefor; all of the foregoing being assembled together into a unitary structure; a flexible water tube leading from the water tube connection and a flexible conduit from the three-way valve; a conduit for connection to a tank; a hydraulically-operated drain valve device connected into the tank conduit having a housing attached to the conduit with a liquid inlet and a valved drain outlet in the housing; the water tube being connected to the liquid inlet and the three-way valve conduit being connected to the hydraulic drain valve device.

13. In a washing apparatus for use in washing a tank: a water conduit connectible into the tank; a drain for the tank having a hydraulically-operated drain valve closed in response to existence of hydraulic pressure and opened upon relief thereof; a cut-off valve in the water conduit, a three-way valve upstream of the cut-off valve, the three-way valve being normally positioned to admit water under pressure to the hydraulically-operated valve to close the same; means to shift the three-way valve to a position to exhaust said hydraulic pressure; and means to open and close the cut-off valve; the upstream disposition of the three-way valve assuring normal closing of the drain valve regardless of the position of the cut-off valve.

14. The apparatus of claim 13, with a second water conduit interconnected with the first downstream of the cut-off valve therein; and a second cut-off valve in the second water conduit.

References Cited by the Examiner

UNITED STATES PATENTS

| | | | |
|---|---|---|---|
| 391,597 | 10/1888 | Ellithorpe | 251—62 X |
| 542,702 | 7/1895 | Christensen | 251—62 X |
| 1,094,922 | 4/1914 | Palmer | 68—184 |
| 1,382,992 | 6/1921 | Lombard. | |
| 1,995,561 | 3/1935 | Belanger | 251—62 |
| 2,174,178 | 9/1939 | Nichols | 68—184 X |
| 2,471,506 | 5/1949 | Wiswall | 134—98 |
| 2,723,537 | 11/1955 | Clark | 251—62 X |
| 3,046,163 | 7/1962 | Kearney | 134—168 X |
| 3,121,536 | 2/1964 | McKibben | 134—176 X |
| 3,132,656 | 5/1964 | Rankin | 134—98 |

FOREIGN PATENTS 395,713  5/1924  Germany.

CHARLES A. WILLMUTH, *Primary Examiner.*

GEORGE J. NORTH, *Examiner.*